Aug. 21, 1945.　　　　E. F. ZAP　　　　2,383,102
AERODYNAMIC MEMBER
Filed Feb. 13, 1942　　　2 Sheets-Sheet 1
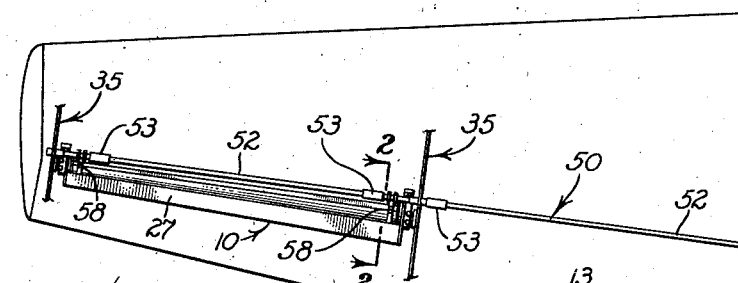
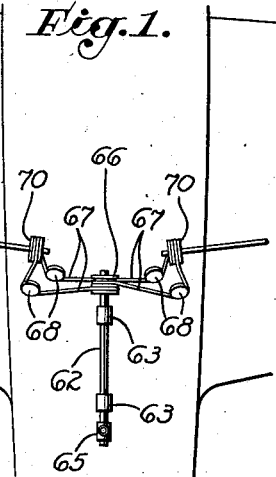
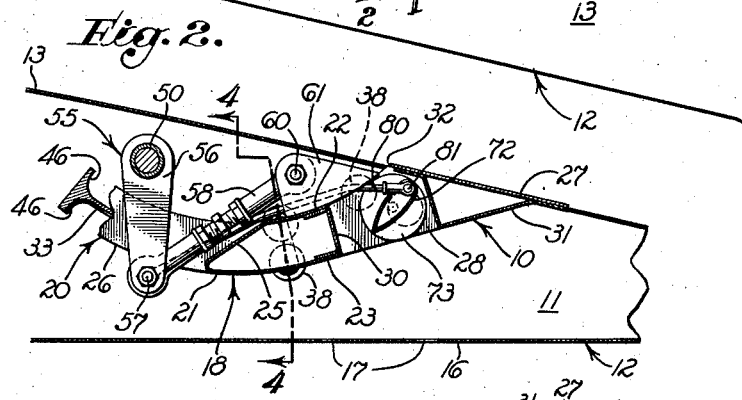
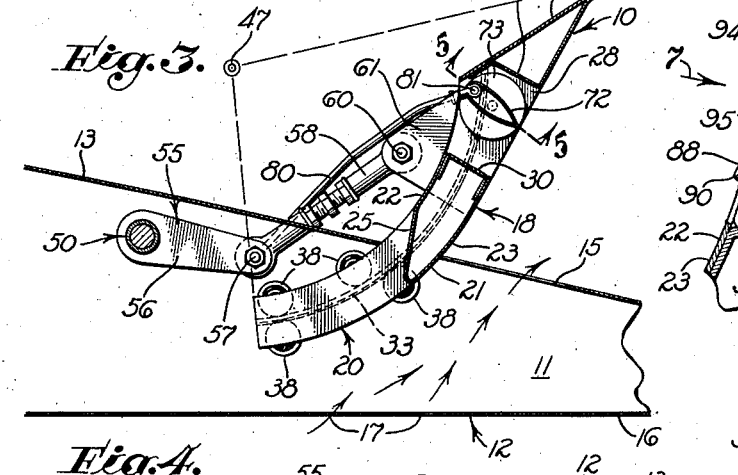
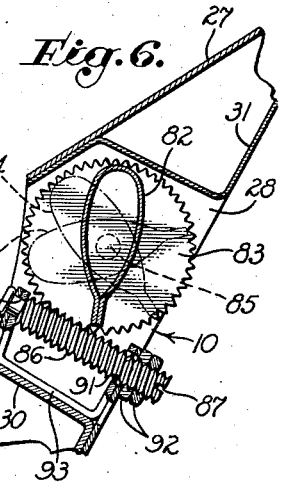
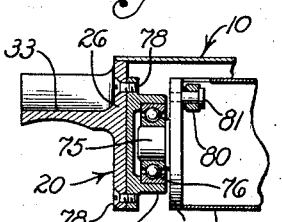
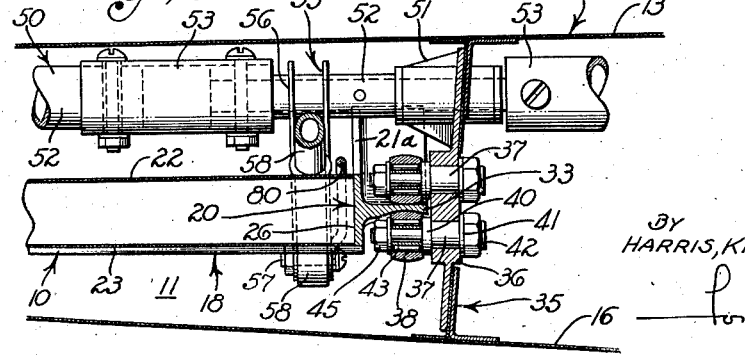
INVENTOR
EDWARD F. ZAP
BY HARRIS, KIECH, FOSTER & HARRIS
ATTORNEYS Aug. 21, 1945.     E. F. ZAP     2,383,102
AERODYNAMIC MEMBER
Filed Feb. 13, 1942     2 Sheets-Sheet 2
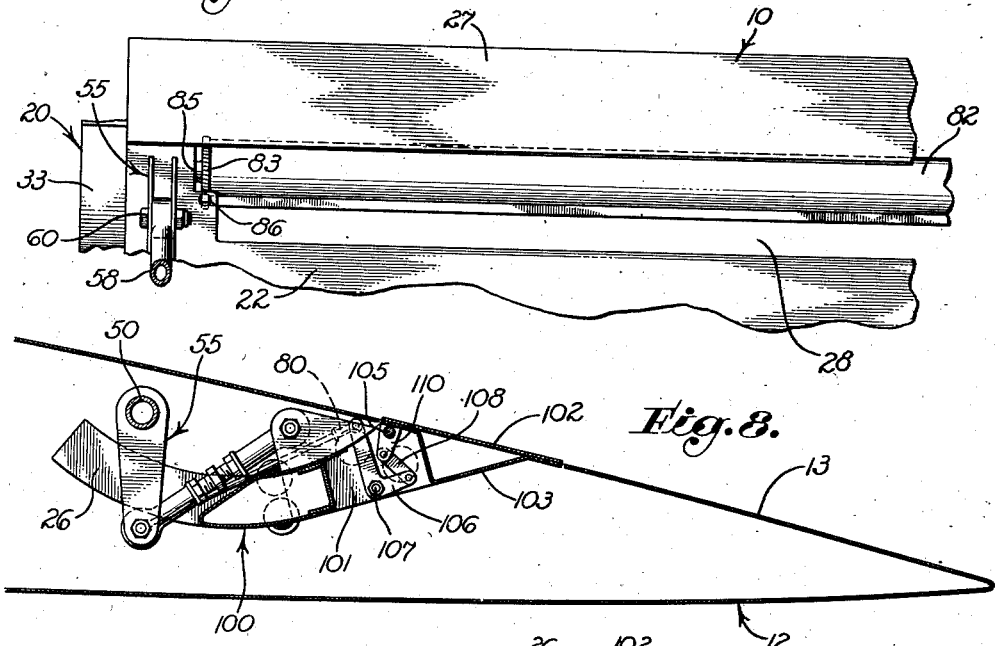
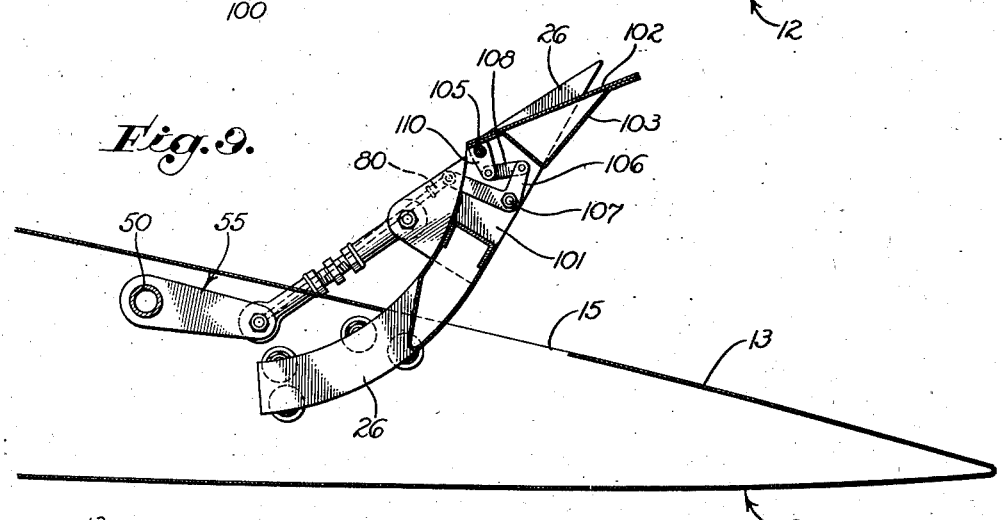
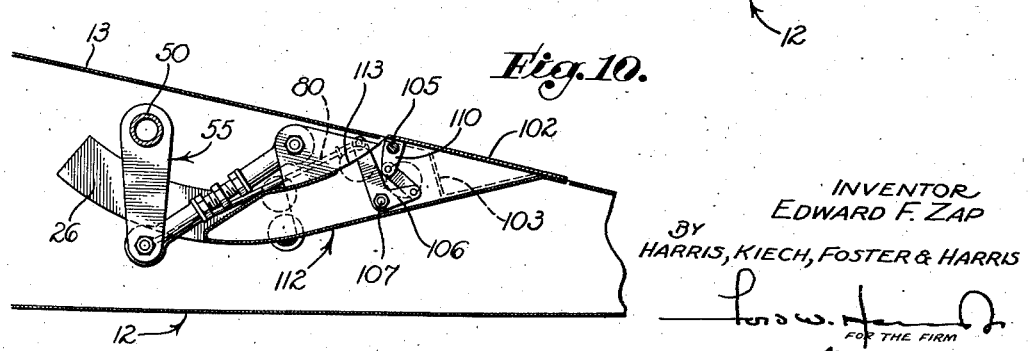
INVENTOR
EDWARD F. ZAP
BY HARRIS, KIECH, FOSTER & HARRIS
FOR THE FIRM
ATTORNEYS Patented Aug. 21, 1945

2,383,102

UNITED STATES PATENT OFFICE 2,383,102

AERODYNAMIC MEMBER

Edward F. Zap, Los Angeles, Calif.

Application February 13, 1942, Serial No. 430,721

7 Claims. (Cl. 244—90)

My invention relates to aerodynamic members such as flaps, ailerons, and the like for controlling aircraft in flight and is particularly directed to improvements in an aerodynamic member of the type that is retractably extended into the air stream.

For the purpose of the present disclosure the invention will be described as embodied in an aileron mounted on the wing of an airplane, but it will be readily understood that the same principles may be incorporated in other types of telescoping aerodynamic members mounted on other parts of an airplane.

The particular aileron chosen to exemplify the invention is mounted in a hollow portion of the airplane wing to move outward from a retracted position at which it is telescoped into the wing, the outward movement being, for example, upward to extended position at which it is acted upon by the air stream. The aileron moves through an opening on the upper side of the wing, and the wing has additional openings on the lower side to permit air to flow upward through the wing when the aileron is extended. In some practices the lower openings may be omitted.

Lateral or rolling control of the aircraft by such an aileron arrangement is achieved both by spoiling lift in the wing and by additionally setting up positive downward reaction of the wing to the air stream. At high speeds of flight the aileron is usually only slightly extended for a control effect and functions primarily as a deflection obstacle in the air, the eddies resulting from the obstacle both serving to spoil the wing lift and to increase drag while simultaneously the reaction of the wing to deflection of the air stream results in a desirable downward thrust on the wing. These effects cause a rolling movement as well as a favorable yaw. At lower speeds the aileron is extended further upward from the wing, but the dominant factor in control may be the flow of air upward through the wing, rather than the aerodynamic effect of the elevated aileron.

An important consideration in designing ailerons of the described character is the effect of aerodynamic forces on the aileron with respect to movement of the aileron along its path of extension and retraction. In prior art arrangements of the general type in mind here, the one pressing problem is to avoid an excessive tendency on the part of the aileron to retract as a result of pressure from the air stream. More often than not this problem is only partially met and excessive forces are imposed on the mechanism controlling the aileron. In my copending application, Serial No. 383,570, entitled "Control system for airplanes," I teach an effective solution for this problem that consists in giving the aileron panel a curved configuration and in providing means for the aileron to move upward and outward in a curved path, the two centers or axes of curvature being outside and above the wing.

My prior application reveals that a simple curved panel mounted for movement along such a curved path will tend to move outward in response to the air stream if the center or centers of curvature of the panel are forward of the center or centers of curvature of the path; will tend to move inward in response to the air stream if the center or centers of curvature of the panel are rearward of the center or centers of curvature of the path; and will be neutral or non-responsive to the air stream if the center or centers of curvature of the panel and of the path substantially coincide. My prior application further teaches that such a curved panel may be provided with a deflection plate for impingement by the air stream to create a force tending to retract the panel.

It is apparent from the foregoing that a curved aileron mounted to move in a curved path may be designed with either an inherent tendency to move outward or an inherent tendency to retract. It is further apparent that the inherent tendency to retract may be derived from the above-mentioned eccentricity of curvature and/or from a deflector plate carried by the aileron. Usually the end to be sought is an aileron that will move readily and yet tend to retract to a degree readily perceptible to the pilot. If the tendency to retract varies with the extension of the aileron, the varying resistance to movement of the control stick gives the pilot a "feel" of the control mechanism that is necessary for skillful flying. Various pilots, however, require different magnitudes of this retraction force to feel at home at the controls, and, since multitudinous mental burdens are imposed on a pilot, it is important to satisfy individual preferences in this respect. One of the objects of the present invention is to provide an aileron of the type under discussion that may be readily adjusted to suit the preferences of different pilots as to the magnitude of the force exerted by the aileron on the control mechanism in the cockpit. In the preferred practice of my invention the adjustability is afforded by a deflecting means adjustably carried by the aileron, the deflecting means being positioned for impingement by the air stream when the aileron is extended.

One of the difficulties that arises in any attempt to predetermine the tendency to retract of a particular aileron panel of the present type is that a fixed adjustment of the aileron to provide a desired retraction force at one extended position of the aileron may be ineffective to provide a retraction force of desirable magnitude at a different extended position of the aileron. This difficulty is generally attributable to the fact that the angle at which a deflecting surface fixed on the curved aileron meets the air stream varies with the degree to which the aileron is extended along its curved path. A further object sought in some practices of the present invention is to provide for the automatic adjustment of such a force-controlling member relative to the aileron in response to movement of the aileron along its path of extension and retraction. It is contemplated that the retraction tendency of the aileron afforded by the deflecting means may be either increased or decreased automatically as the aileron is extended, the variation in magnitude being in accord with whatever desired effect the designer has in mind.

As disclosed in my above-mentioned copending application, I may find it to be desirable to provide one or more air passages through an aileron of the present type to prevent lag in responsiveness of the aircraft to aileron movement, such a passage or passages through the aileron being especially desirable if the aileron is positioned within the forward 80% of the wing chord. Certain objects of the present invention relate to such an air passage. One of these objects is to cause the air passage through the aileron to become effective early in the initial extension of the aileron. This object is achieved by placing the passage through the aileron relatively close to the initially extended portion of the aileron and may be further favored by making the outer edge of the passage relatively sharp. Another of these objects is to provide a second function for the air stream through such an aileron passage, namely, the function of applying pressure against an air-deflecting member, the air-deflecting member being mounted on the aileron at an angle to produce a desirable tendency for the aileron to move either inwardly or outwardly along its path of extension and retraction. The preferred form of my invention is characterized by a transverse slot in which is mounted a vane adapted to be moved to various positions for deflecting air flowing through the slot.

The above and other objects of my invention will be apparent in my detailed description to follow, taken with the accompanying drawings.

In the drawings, which are to be considered as illustrative only:

Fig. 1 is a diagrammatic plan view of an aileron in retracted position and the associated control mechanism, the aileron being equipped with an air-deflecting member that is automatically adjusted in response to movement of the aileron;

Fig. 2 is a transverse section on an enlarged scale taken as indicated by the line 2—2 of Fig. 1;

Fig. 3 is a view similar to Fig. 2 showing the aileron in extended position;

Fig. 4 is a greatly enlarged section taken as indicated by the irregular line 4—4 of Fig. 2;

Fig. 5 is an enlarged section taken as indicated by the line 5—5 of Fig. 3;

Fig. 6 is an enlarged fragmentary section indicating how the aileron may be equipped with an air-deflecting member in combination with means for adjusting the deflecting member to selected fixed positions;

Fig. 7 is a fragmentary view of the aileron taken as indicated by the arrow 7 in Fig. 6;

Fig. 8 is a view similar to Fig. 2 showing a modified form of the aileron with the automatic feature;

Fig. 9 is a similar view of the aileron at an extended position; and

Fig. 10 is a view similar to Fig. 8 showing another modified form of the aileron with the automatic feature.

The aileron generally designated 10 in Figs. 1 to 5 is mounted in a hollow portion 11 of a wing 12, the hollow portion being near the trailing edge of the wing. The upper skin 13 of the wing 12 is formed with an opening 15 through which the aileron is extended and retracted, and the lower skin 16 of the wing may have one or more openings 17 through which air may enter and subsequently flow outward through the upper opening 15 as indicated by arrows in Fig. 3.

The aileron 10 comprises one or more curved aileron panels 18 that are mounted in the hollow portion 11 of the wing in any suitable manner providing for guidance in a curved path through the wing opening 15. For example, each panel may have a curved track member 20 at each of its sides, and each of these track members may be movably engaged by suitable guiding rollers. In the particular construction shown in the drawings, an aileron panel 18 includes a plate 21 of suitable material that is bent to form a forward curved wall or skin 22, a rearward curved wall or skin 23, and an inner end wall 25. The plate 21 is attached by its opposite side edges to the corresponding track members 21a, the track members including webs 26 that serve as side walls for the panel. The track webs 26 are of flaring configuration towards their outer ends and are interconnected at their outer ends by a plate 27 that serves as the outer end wall of the panel.

The end plate 27 is spaced from the two edges of the plate 21 to form a passage or slot 28 that permits air to flow rearward through the panel. In the particular construction shown in the drawings, a wall for the passage 28 is provided by a channel member 30 mounted between the edges of the plate 21, and a second wall for the passage is provided by an angular plate 31 attached to the inner side of the end plate 27. It will be noticed that the passage 28 is at the outer end of the aileron to become effective whenever outward extension of the aileron is initiated and that the passage 28 has a relatively sharp forward edge 32 provided by the end plate 27.

Each of the curved track members 20 provides a laterally extending curved flange 33 extending adjacent one of the ribs 35 of the wing. Included in the structure of the rib 35 is one or more castings 36 in which are mounted various spindles 37 for guide rollers 38. As best shown in Fig. 4, each of the spindles 37 has an annular shoulder 40 to abut one face of a casting 36 and is provided with a washer 41 and nut 42 on the opposite face of the casting to hold the spindle in place. Each of the guide rollers 38 is provided with an anti-friction bearing 43 and is retained on its spindle 37 by a suitable nut 45. Four such guide rollers 38 mounted on spindles 37 may be provided, two rollers engaging the upper side of the track flange 33 and two of the rollers engaging the lower side of the track flange, the four rollers being disposed, for example, as best shown in Fig. 3. The track flange 33 may have integral stop portions 46 at its inner end to cooperate with the rollers 38 to limit the outward movement of the aileron panel.

If the aileron 10 is of such length that it must be divided into more than one panel 18 to clear ribs 35 in the wing 12, the various panels may have a common end plate 27, the end plate serving to interconnect the panels in a unitary manner. It is apparent that the end plate 27 may have several functions and purposes. In addition to the functions and purposes already mentioned, the end plate 27 serves as a closure for the wing opening 15 when the aileron 10 is retracted and serves as what may be termed a primary deflection plate when the aileron is extended as shown in Fig. 3. In deflecting the air stream when the aileron is extended, the end plate 27 creates by reaction to the air stream a tendency for the aileron to retract into the wing.

It is to be noted that in designing the aileron 10 for an inherent tendency to retract into an airplane wing, reliance may be placed on such a primary deflecting means in the form of the end plate 27, or reliance may be placed on eccentricity of curvature of the aileron relative to the curvature of the aileron path as determined by the configuration of the track flange 33. If such eccentricity exists, the forward skin 22 of the aileron serves as the primary deflecting means, since the eccentricity is effective by reason of the air stream impinging against and being deflected by the forward side of the aileron. In some practices of my invention reliance may be placed on both of these expedients.

In the particular form of the invention shown in Figs. 1 to 5, it may be assumed that both the curvature of the aileron as represented by the forward skin 22 and the curvature of the path of the aileron as represented by the track flange 33 have a common center or axis of curvature designated 47 in Fig. 3. In such an arrangement the air stream impinging on the forward skin 22 of the aileron has substantially no effect on the aileron with respect to movement along its curved path, and the tendency of the aileron to retract is derived primarily from air pressure exerted against the inclined surface of the end or deflecting plate 27.

The aileron 10 may be actuated by any suitable control mechanism. In the particular construction shown in Figs. 1 to 5 a suitable operating shaft 50 extends through each wing 12, the operating shaft being journaled in suitable bearings 51 and comprising a number of shaft sections 52 interconnected by suitable couplings 53. For each aileron panel 18 in a wing the operating shaft 50 is provided with a pair of spaced actuating arms generally designated 55, each actuating arm comprising two parallel bars 56. The outer ends of the two actuating arms 55 are connected by pivot means 57 to adjustable links 58, and the adjustable links are in turn connected to the aileron panel by pivot means 60. The pivot means 60 at the end of each adjustable link 58 may be mounted in a pair of bracket plates 61 unitary with the aileron panel.

It is apparent that rotation of one of the operating shafts 50 causes corresponding extension or retraction of the corresponding aileron 10 along its curved path as may be readily understood by comparing Figs. 2 and 3. Any of the various well known arrangements may be employed for operating the two shafts 50 from the cockpit of the airplane. The control mechanism shown in Fig. 1 includes the usual torque tube 62 mounted in bearings 63 in the cockpit, the torque tube carrying the usual control stick 65 and being provided with a cable drum 66. Cables 67 wound on the drum 66 pass around various pulleys 68 and around drums 70 on the inner ends of the shafts 50. When the control stick 65 is swung to the left, as viewed in Fig. 1 for example, the left aileron 10 is extended to cause the left wing 12 to drop and simultaneously cause the drag in the left wing to increase.

The form of the invention shown in Figs. 1 to 5 is characterized by deflecting means having the function of automatically varying automatically modifying the inherent tendency of the aileron to retract in response to pressure from the air stream. In the absence of the end plate 27, such an automatic means in a concentric arrangement would be the sole factor determining the tendency of the aileron to retract. In the presence of the end plate 27, however, the automatic deflecting means serves as an auxiliary deflecting means to supplement the actuating effect of the end plate, and the effect of the auxiliary deflecting means may be either to oppose or to augment force created by the primary deflecting means or end plate 27. Since it is necessary merely that the auxiliary deflecting means be subject to the pressure of the air stream to serve its purpose, it is apparent that the auxiliary deflecting means may be mounted at various locations on the aileron 10. A feature of the preferred form of the invention, however, is the concept of mounting the auxiliary deflecting means within the confines of the air passage or slot 28.

As best shown in Figs. 2, 3, and 5, a hollow vane 72 of streamline configuration may be unitary with two end discs 73 providing trunnions 75. An anti-friction bearing 76 journaling each of the trunnions 75 is housed in a suitable fitting 77 and each of the two fittings is mounted on the inner face of the corresponding track member 20 by suitable screws 78. The described arrangement permits the vane or deflecting member 72 to rotate freely on the axis defined by the two trunnions 75.

Any suitable actuating means may be provided to cause the vane 72 to be rotated automatically on its axis in the course of movement of the aileron 10 along its curved path. For example, the desired control of the vane may be achieved by a suitable operating connection with the mechanism for actuating the aileron. Thus I may simply connect the vane 72 to the previously mentioned pivot 57 by a suitable link 80. As indicated in Fig. 1 there may be two such links 80, one for each of the two pivot means 57, and as shown in Figs. 3 and 5 each of the links 80 may be pivotally connected to a suitable stud 81 mounted on the corresponding disc 73 at one end of the vane.

Comparison of Figs. 2 and 3 reveals that each of the pivot means 57 in the mechanism for controlling the aileron is relatively close to the rotary axis of the vane 72 when the aileron is retracted, but the intervening distance progressively increases as the aileron is extended. Since this distance progressively changes, the link 80 causes the vane to rotate in accord with movement of the aileron along the curved aileron path.

It will be readily apparent to those skilled in the art that the arrangement is quite flexible in the sense that the designer may achieve various ends in the automatic operation of the vane 72. In the arrangement shown in Figs. 1 to 5, for example, the vane may be intended to modify the inherent tendency of the aileron to retract when extended into the air stream. As stated heretofore, the inherent tendency of this particular aileron to retract in the absence of a vane 72 is derived solely from the effect of the end plate or deflection plate 27, since the curvature of the aileron and the curvature of the aileron path are concentric. The desirability of modifying the inherent tendency of the aileron to retract may arise from the fact that the deflection plate 27 on the end of the aileron moves into relatively steep angles as the aileron approaches its upper limit position, the pressure of the air stream against the steeply inclined plate being such as to exert excessive force on the control stick 65 through the aileron mechanism. In the above described arrangement, however, the vane 72 is automatically rotated into angles to progressively oppose retraction of the aileron as the aileron approaches its upper limit position. In other words, the air stream passing through the aileron slot 28 impinges on the inclined forward or under face of the vane, thereby creating a minor force tending to extend the aileron, and this minor force modifies or opposes the major force in the opposite direction caused by the deflection plate 27. It is apparent that the vane may likewise be arranged to modify or supplement inherent aileron forces produced by eccentricity between the curvature of the aileron and the curvature of the aileron path.

Figs. 6 and 7 indicate how an adjustable vane 82 similar in configuration to the automatic vane 72 may be mounted in the same position in the aileron slot 28. The vane 82 is attached at each end to a worm gear 83, the two worm gears 83 being rotatably mounted on the aileron by trunnions 85 in the manner heretofore described with reference to the end discs 73. Each of the worm gears 83 at each end of the aileron slot 28 is in mesh with an adjustment worm 86 having an end slot 87. At its forward end each adjustment worm 86 is journaled in a suitable bore 88 in the aileron structure and is provided with a head 90 to prevent axial movement, while the rear end of the worm extends through a second bore 91 in the aileron structure and is provided with a pair of lock nuts 92. For reinforcement of the aileron structure in the vicinity of each worm 86 a U-shaped strap 93 may be employed at each end of the aileron slot 28 as shown in Fig. 6.

The vane 82 has substantially no force-creating effect with respect to the aileron if the vane is tangential to the center or axis of curvature of the aileron path, i. e. if the vane is perpendicular to a radius drawn to the center of curvature of the track flange 33. At such a position of adjustment, which may be termed the neutral position, the vane is turned directly across the air stream through the aileron slot 28, but the vane is narrower than the slot and therefore merely restricts the air stream therethrough. If the aileron is adjusted to an upwardly inclined position, as indicated by the dotted line 94 in Fig. 6, the impingement of the air stream against the inclined under surface of the vane will create a force tending to extend the aileron. On the other hand, if the vane 82 is inclined downwardly to the position indicated by the dotted line 95, the air stream impinging on the inclined upper surface of the vane will create a force tending to retract the aileron. In either inclined position the vane 82 will modify the inherent tendency of the aileron to move along its path of operation in response to pressure from the air stream. It is apparent that a pilot by simple experimentation may arrive at a particular adjustment of the vane 82 to suit his individual preference as to the magnitude of force transmitted to the control stick when an aileron is extended.

Figs. 8 and 9 show an aileron 100 with a spanwise slot 101 corresponding to the previously mentioned slot or passage 28. The aileron 100 is of the same general construction as heretofore described, identical parts being designated with corresponding numerals. The aileron 100 differs from the first described construction, first, in the omission of a vane in the slot 101 and, second, in the fact that the aileron has an end plate or deflecting member 102 that is movable to various angles relative to the aileron.

In the particular construction shown in Figs. 8 and 9 the end plate 102, suitably reinforced by an angular plate 103, is pivoted on studs 105 at each end of the slot 101. Also at each end of the slot 101 a bell-crank 106 mounted on a suitable pivot means 107 has one arm connected to the previously mentioned operating rod 80 and has its other arm connected by a link 108 to a small arm 110 integral with the end plate 102. As the aileron 100 is shifted outward to its extreme position indicated in Fig. 9, the described mechanism automatically causes the end plate 102 to rotate clockwise through a substantial angle. The purpose of providing such clockwise rotation of the end plate is in this instance to avoid any excessive tendency of air impinging on the end plate to cause the aileron to retract from the position in Fig. 9. Obviously the arrangement may be adapted to increase rather than decrease the tendency of the aileron to retract.

The aileron 112 shown in Fig. 10 is similar to the last-described aileron shown in Figs. 8 and 9, corresponding numerals being employed to designate corresponding parts. The aileron of Fig. 10 differs, however, in the omission of the spanwise slot or passage 101. The upper or forward wall 113 of this aileron is solid except for small fore-and-aft slots 113 through which the bell-cranks 106 extend.

It will be readily understood that the specific arrangements described herein may be modified and changed radically in embodying my basic concepts, and I reserve the right therefore to all expressions of the invention that properly lie within the scope of my appended claims.

I claim as my invention:

1. In an aircraft, the combination of: an airfoil having a hollow portion with an opening to the surface of the airfoil; an aerodynamic member mounted in said hollow portion, said aerodynamic member being movable along a path through said opening into the air stream outside the airfoil; actuating means to move said aerodynamic member along said path; means movably mounted on said aerodynamic member to present a deflection surface to the air stream thereby to create a force tending to move the aerodynamic member along said path; and means to move said deflection means relative to said aerodynamic member in accord with changes in position of the aerodynamic member along said path.

2. In an aircraft, the combination of: an airfoil having a hollow portion with an opening to the surface of the airfoil; an aerodynamic member mounted in said hollow portion to move on a path through said opening into the air stream outside the airfoil, said aerodynamic member having an inherent tendency to move along said path, said aerodynamic member having a passage therethrough to permit flow of air from one side of the aerodynamic member to the other when the member is extended into the air stream; means movably mounted on said aerodynamic member to present a deflecting surface to said air flowing through said passage thereby to create a force to modify said tendency of the aerodynamic member to move along said path; and means to vary the position of said deflecting means relative to said aerodynamic member in response to movement of the aerodynamic member along said path.

3. In an aircraft, the combination of: an airfoil having a hollow portion with an opening to the surface of the airfoil; an aerodynamic member of curved fore-and-aft cross-sectional configuration mounted in said hollow portion to extend through said opening; means to shift said aerodynamic member along a curved path into the air stream outside the airfoil; means on said aerodynamic member providing a primary deflection surface for impingement by the air stream to create a tendency for the aerodynamic member to retract into said airfoil; auxiliary means on said aerodynamic member providing an auxiliary deflection surface for impingement by the air stream to create a supplemental tendency for the aerodynamic member to move along said path, said auxiliary means being movable through a range of angles relative to the aerodynamic member to vary the magnitude of said supplemental tendency; and means to vary the position of said auxiliary deflecting means relative to said aerodynamic member in response to movement of the aerodynamic member along said path.

4. In an aircraft, the combination of: an airfoil having a hollow portion with an opening to the surface of the airfoil; an aerodynamic member mounted in said hollow portion to extend through said opening, said aerodynamic member having a transverse slot therethrough to permit flow of air from one side of the aerodynamic member to the other when the aerodynamic member is in an extended position, said slot being close to the outer end of said aerodynamic member to cause early initiation of air flow through the slot when the aerodynamic member is initially extended; means to shift said aerodynamic member on a path through said opening into an air stream outside the airfoil; and a vane mounted across said slot lengthwise thereof at an angle to deflect air flowing through the slot thereby to create a force tending to move the aerodynamic member along said path.

5. In an aircraft, the combination of: an airfoil having a hollow portion with an opening to the surface of the airfoil; an aerodynamic member mounted in said hollow portion to extend through said opening, said aerodynamic member having a transverse slot to permit flow of air through said aerodynamic member from one side to the other when said aerodynamic member is extended through said opening; means to shift said aerodynamic member on a path through said opening; and deflection means mounted in said slot for rotational adjustment about an axis lengthwise of the slot, said deflection means being narrower than the slot, whereby the deflection means may be rotated to restrict but not cut off air flow through the slot.

6. In an aircraft, the combination of: an airfoil having a hollow portion with an opening to the surface of the airfoil; an aerodynamic member mounted in said hollow portion, said aerodynamic member being movable along a path through said opening into the air stream outside the airfoil; deflection means movably mounted on said aerodynamic member to present a deflection surface to the air stream, whereby a force is exerted upon the aerodynamic member in the direction of its travel; and actuating means associated with said deflection means, said actuating means being operative by movement of said aerodynamic member along such path, whereby the resultant force of the air stream on said member in the direction of its travel is maintained at the desired value at every portion of such travel.

7. In an aircraft, the combination of: an airfoil having a hollow portion with an opening to the surface of the airfoil; an aerodynamic member mounted in said hollow portion to extend through said opening, said aerodynamic member having a transverse slot to permit flow of air through said aerodynamic member from one side to the other when said aerodynamic member is in an extended position; means to shift said aerodynamic member on a path through said opening; and deflection means mounted in said slot for rotational adjustment about an axis lengthwise of the slot, said slot being near the outer end of the aerodynamic member and the outer edge of said slot being relatively sharp to permit early initiation of air flow through the slot when the aerodynamic member is initially extended along said path.

EDWARD F. ZAP.

CERTIFICATE OF CORRECTION.

Patent No. 2,383,102.  August 21, 1945.

EDWARD F. ZAP.

It is hereby certified that error appears in the printed specification of the above numbered patent requiring correction as follows: Page 3, second column, line 16, after "varying" insert --or--; and that the said Letters Patent should be read with this correction therein that the same may conform to the record of the case in the Patent Office.

Signed and sealed this 4th day of December, A. D. 1945.

Leslie Frazer
(Seal)  First Assistant Commissioner of Patents.